United States Patent [19]

Lewis

[11] Patent Number: 5,448,835
[45] Date of Patent: Sep. 12, 1995

[54] COMPASS DEVICE

[76] Inventor: W. Stan Lewis, 709 Mar Vista Dr., Vista, Calif. 92083

[21] Appl. No.: 297,850

[22] Filed: Aug. 30, 1994

[51] Int. Cl.⁶ .................... G01C 17/26; G01C 17/18
[52] U.S. Cl. .................................. 33/355 R; 33/360; 33/363 K; 33/364
[58] Field of Search .............. 33/355 R, 360, 344, 33/345, 346, 349, 364, 363 R, 363 K, DIG. 3

[56] References Cited

U.S. PATENT DOCUMENTS

| | | | |
|---|---|---|---|
| 4,047,168 | 9/1977 | Fowler | 33/363 R |
| 4,117,602 | 10/1978 | Lapeyre | 33/363 K |
| 4,341,023 | 7/1982 | Marcus et al. | 33/363 K |
| 4,414,754 | 11/1983 | Lapeyre | 33/363 K |
| 4,577,414 | 3/1986 | Migliori et al. | 33/363 K |
| 4,720,631 | 1/1988 | Lapeyre | 250/231 SE |
| 5,079,845 | 1/1992 | Childers | 33/355 R |

OTHER PUBLICATIONS

"A Dictionary of Symbols" 2nd ed., J. E. Cirlot, 1971 2nd ed. ISBN 0-88029-702-6, pp. 48, 49, 98, 99, 246, and 247 (no month).
"The Book of the Dragon", Griffiths et al., 1979 (no month) ISBN 0-89009-241-9 p. 10.

*Primary Examiner*—Christopher W. Fulton
*Attorney, Agent, or Firm*—Thomas Hamill, Jr.

[57] ABSTRACT

A low cost, simple apparatus is disclosed which can be used to provide positional information relative to an external magnetic field. The apparatus comprises a rotatably mounted slotted disk wherein the slot is continuously varying in width around the circumference of the disk. The disk incorporates an elongated magnet which causes it to rotate in relation to an external magnetic field. The slotted disk is placed in a fluid filled chamber. A first and second aperture are located on the top and bottom elements of the chamber defining an emission passage. The apertures have a rectangular length approximately the maximum width of the slot. The slotted disk is intermediate the apertures. A source detector is provided below the chamber proximal an emission source, and a second source detector is provided above the chamber. The source detectors provide a response to the intensity of emission incident upon them. As the disk rotates the continuously variable width of the slot linearly attenuates the source intensity relative to the second source detector. The position of the disk is thus determinable from the intensity of the source received by the first source detector in relation to the second source detector since the detectors response function is known a priori. The primary use of the invention is as a compass which would include a digital display output. Applications include navigation, aerospace, robotics and defense.

19 Claims, 5 Drawing Sheets

COMPASS DEVICE

BACKGROUND OF THE INVENTION

1. Field of the Invention

The present invention relates generally to compasses, and more particularly, to a compass which utilizes a compass card intermediate a light source and a photon detector means. The compass card has a light transmission slot which varies in width, the light transmission slot attenuates the light intensity mechanically in such a manner where the instantaneous light intensity transmitted therethrough itself gives positional information.

2. Description of the Prior Art

Compasses which utilize a rotating disk with a light attenuation means located thereon have been disclosed in the form of an optical shaft encoder and are well known in the art.

A typical example of such a device is U.S. Pat. No. 4,117,602 issued to Lapeyre. This device incorporates a light emitting diode to illuminate a series of tracks on a coded disk. The tracks located on the coded disk are a plurality of alternating light transmissive and light opaque regions which represent one bit of a multiple bit digital code. A sensor array senses the light transmitted through the disk as the disk is rotated by a magnet means and through appropriate signal processing is able to decode the signals into directional information.

Other means to derive information from a light source and a compass card is shown in U.S. Pat. No. 4,577,414 to Migliori et al. This device includes a compass disk which is rotatable and has a magnet means and a light polarizing means located thereon. A light beam is split into a plurality of beams two of which pass through a first polarizing means and two of which pass through a second polarizing means, the second polarizing means having their optical axes at right angles to the first polarizing means. By comparison of the ratio of the intensities of the beams which pass through the polarizing means one may determine the angle of the magnet means in relation to a fixed axis of the compass body.

U.S. Pat. No. 4,720,631 issued to Lapeyre discloses a compass card which has a linear photodetector array in a spatial relation with a light source. Intermediate the photodetector array and the light source is a rotating disk with slots located thereon. As the disk rotates the light is passed through the slots in such a manner that the linear photodetector array may detect a certain or specific random pattern of illumination which corresponds to a specific disk position. The signals generated by the photodetector array are decoded on the basis of a unique positional calibration stored in a read-only-memory and then output to the user.

Thus, while the foregoing body of prior art indicates it to be well known to use encoder shafts and other means to determine position by utilizing digitizing means and polarization means, the provision of a more simple and cost effective electronic compass device which may be mass produced and utilized by the common man is not contemplated. Nor does the prior art described above teach or suggest a simple compass device which utilizes a compass card having a light transmission slot which varies in width whereby the light transmission slot attenuates the light intensity mechanically in such a manner where the instantaneous light intensity transmitted therethrough itself gives positional information.

The foregoing disadvantages are overcome by the unique compass card of the present invention as will be made apparent from the following description thereof. Simplicity is evident over the prior art in that the response function is a linear function of the source emission intensity striking one or more detectors as described herein. The linearity is determined by the linearly variable width of the slit and the source detector means employed, the source detector being selected to have a linear response to the incident intensity. Further, neither expensive polarizing sheets or fiber optic cables are needed nor are extensive read-only-memory to store positional correlation information. Other advantages of the present invention over the prior art also will be rendered evident.

SUMMARY OF THE INVENTION

To achieve the foregoing and other advantages, the present invention, briefly described, provides a low cost, simple apparatus to yield positional information relative to an external magnetic field. The apparatus consists of a slotted disk wherein the slot is continuously varying in width around the circumference of the disk. The disk incorporates a magnet which causes it to rotate in relation to an external magnetic field. The slotted disk is mounted on a mount which permits the disk to rotate freely. A cylindrical chamber surrounds the slotted disk, the cylindrical chamber has a top element, a bottom element, and a side element. The cylindrical chamber is fluid filled. The fluid acts as a damping means. A first and second aperture are located on the top and bottom of the cylindrical chamber defining an emission passage. The apertures have a rectangular length approximately the width of the slot. The area of the apertures are approximately that of the sensitive areas of the emission detectors employed. The slotted disk is positioned intermediate the apertures with the slot located within the emission passage.

An isotropic emission source is located below the chamber. A first source detector is located proximal the emission source. The first source detector generates a signal proportional to the intensity of the emission source.

A second source detector is located atop the chamber. The second source detector generates a signal proportional to the intensity of the emission which passes through the chamber. The emission that passes through the chamber is attenuated first by the bottom aperture and then by the position of the slotted disk.

The first and second source detectors provide a response to the intensity of emission incident upon them. As the slotted disk rotates the continuously variable width of the slot linearly attenuates the source intensity relative to the second source detector. The absolute position of the disk is thus determinable from the relation of the two intensities of the emissions detected by the first and second source detectors since the detector's response function is known a priori. The primary use of the invention is as a compass which would include a digital display output.

The ouroboros is an archaic term applied to a tail biting dragon or serpent used to symbolize circumference or eternity. In the context of this disclosure it is used as a noun to describe a right triangle where the hypotenuse and side opposite are pulled at the apex of the angle which joins them in a full circle, the apex so rotated then contacts the side opposite that apex at the base of the right angle. The term ouroboros is used to describe the continuously varying width slot of the slotted disk of the instant invention and will be referred to as such below.

General Theory of Operation

The compass disclosed herein comprises a rotatably mounted slotted disk on which is mounted an elongated magnet. The slotted area of the disk forms a passage, this passage is proximal to the circumference of the disk. The slotted disk is affixed in a cylindrical chamber. An emission source resides below the cylindrical chamber in an emission housing, the emission source has a first emission source detector located in proximal relation. Emanations from the emission source pass through the cylindrical chamber which surrounds the slotted disk, and strike the first emission source detector. The emanations pass through a first and second aperture located on the top of the chamber and the bottom of the chamber, respectively. The top aperture and bottom aperture are rectangular and define an emission passage. The rectangular apertures are covered by a membrane transparent to the source emission spectrum. Source emanations pass through the variable width slot in the rotatably mounted disk and strike the second emission source detector. The second source detector means is selected such that the response function of the detector is preferably linear, or otherwise well known, with respect to incident intensity upon it from the emission source. The slot width changes continuously and linearly as the disk rotates, such that the first emanation intensity striking the source detector is attenuated as the disk rotates. This attenuation of the source emission emanations first intensity causes the source emanation to be detected as a second intensity, the second intensity described being less than the first, the first intensity being detected by the first source detector. Variations in the second intensities relative to the first intensity are thus an indication of the orientation of the disk.

The discussion of the preferred embodiment will fully illuminate the operation of the disclosed device.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least one preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved directional orientation device which has all of the advantages of the prior art and none of the disadvantages.

This invention provides for directional information, as a compass, with respect to orientation in an external magnetic field. It is an object of the present invention to provide a low cost electronic orientation device with digital output sensitive to an external magnetic field having simple circuitry and logic.

It is an object of this invention to provide a low cost compass which provides for a signal which varies linearly with a direction or bearing indicated. This is accomplished by providing a slot of continuous, linear, varying width on the compass card and by employing source detector means which provide a signal which is a linear function of the emission intensity received by the source detector means.

It is an object of this invention to provide a compass with a digital display output, such as a LCD output, which provides for a signal which varies linearly with a direction indicated. This is accomplished by providing a slot of continuously varying width on the compass card and by employing a source detector means which provides a signal that is a linear function of the emission intensity received by the source detector means.

It is a further object of this invention to provide a very low cost directional orientation device for use where generally low orientation resolution is adequate. The orientation resolution is a function of the rate of change of width of the slot and the aperture width which attenuate the source emission each in relation to the response sensitivity of the source detector means employed.

It is another object of the present invention to provide a new an improved directional orientation device which may be easily and efficiently manufactured and marketed.

It is a further objective of the present invention to provide a new and improved directional orientation device which is light weight and of durable and reliable construction.

An even further object of the present invention is to provide a new and improved directional orientation device which is susceptible of a low cost of manufacture with regard to both materials and labor, and which accordingly is then susceptible of low prices of sale to the consuming public, thereby making such a directional orientation device readily available to the buying public.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

To meet the aforementioned objectives the following preferred embodiment is disclosed.

Figure 1:
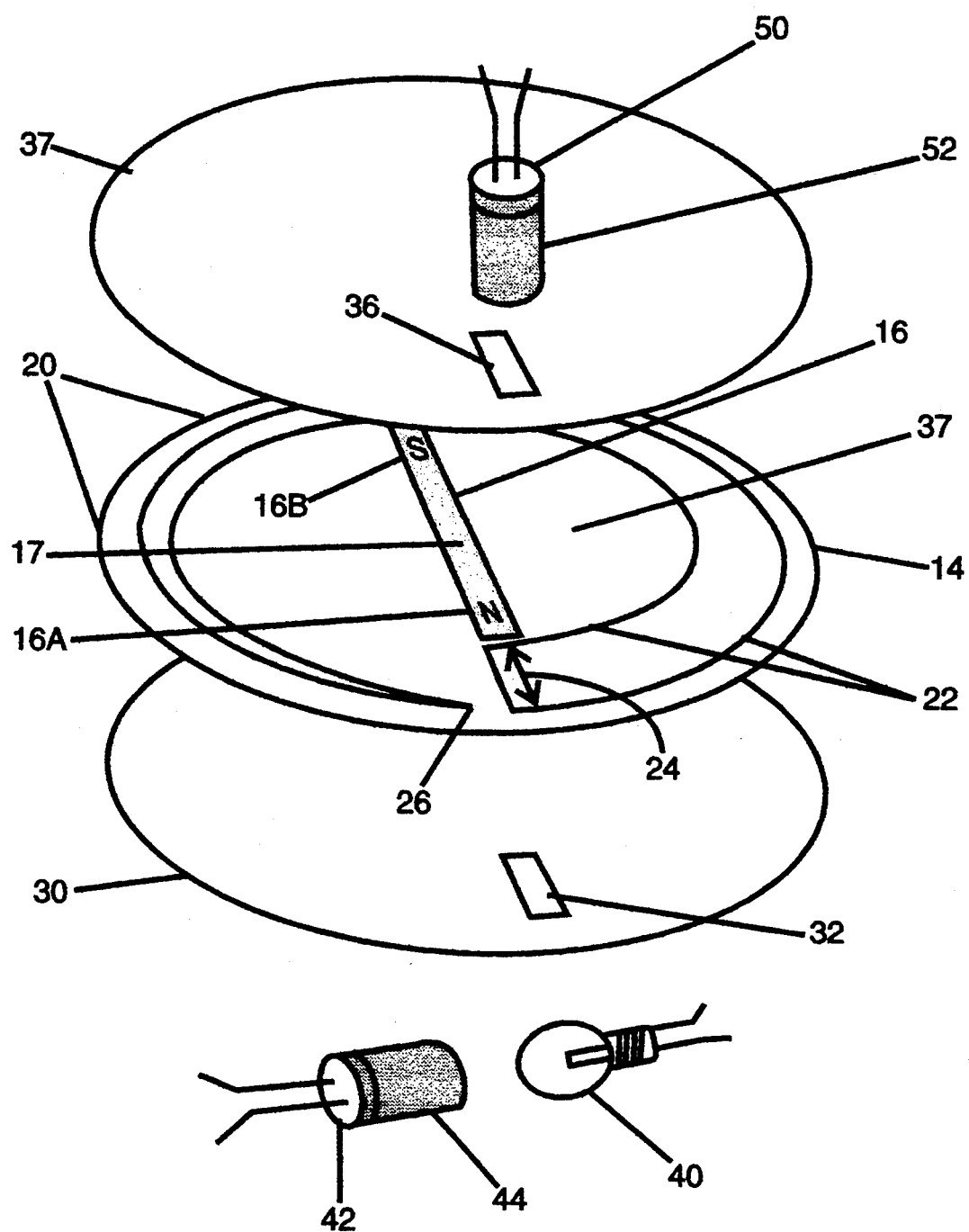
FIG. 1 presents an exploded view of the invention. Illustrated is the rotatably mounted disc showing the spatial relationship of the ouroboros or circular slot of continuously varying width and the chamber with rectangular apertures combined with the source emission means and the source detection means.
Figure 2:
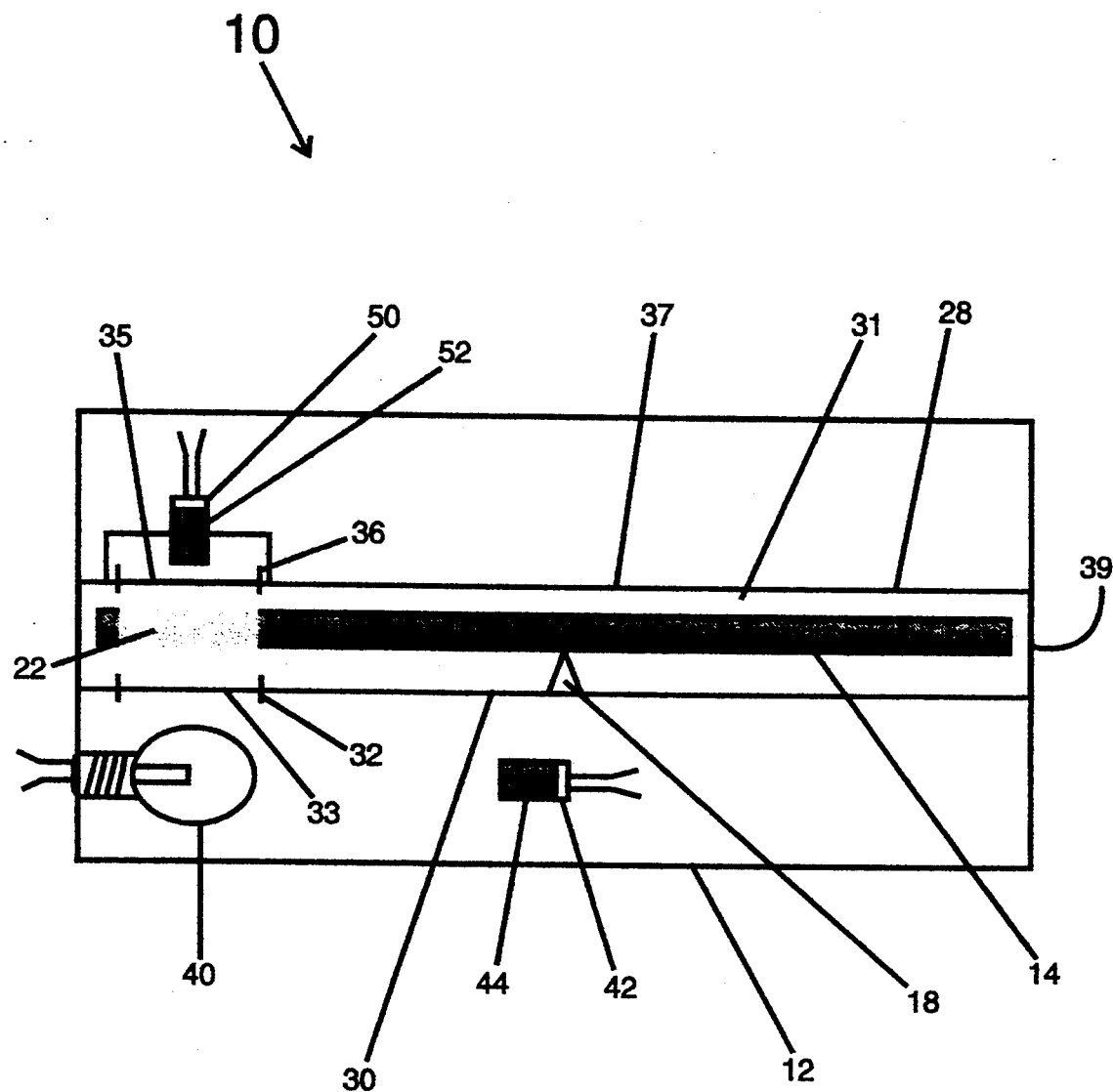
FIG. 2 presents a cross sectional view of the preferred embodiment described in FIG. 1.

Referring specifically now to the Figures the compass device is shown. As best illustrated in FIG. 2 a housing 12 surrounds an inner housing, an emission source, and a plurality of emission detectors. Referring now specifically to FIG. 1 a slotted disk 14 or compass card is provided. The slotted disk 14 has an elongated permanent magnet 16 mounted thereon. The slotted disk 14 includes a mounting means 18, best shown in FIG. 2, which would suspend the slotted disk in such a fashion to permit it to freely rotate. The slotted disk has a center 17 and a circumference 20. A slot 22 is provided generally about the circumference 20 which defines a passage through the slotted disk 14. The slot 22 has a maximum width 24 and a minimum width 26. The slot 22 varies in width as the slot 22 circumscribes the circumference 20 of the slotted disk 14. No two slot 22 widths are the same and the width becomes smaller from the maximum width 24 to the minimum width 26. The slot 22 approximates the shape of an ouroboros, as defined herein, or an elongated triangular element which has been scribed about the circumference of the slotted disk 14.

The permanent magnet 16 has a north direction 16A and a south position 16B. The magnet 16 is orientated in such a fashion where the north direction 16A is facing the point of maximum width 24 on the slot 22 in a radial fashion.

An emission source 40 is located below the bottom element 30. The emission source 40 may be a radiation source, an ultraviolet source, an infrared or near infrared source, a light emitting diode, a visible light source, or any other appropriate emission source. A first detector 42 is proximal the emission source 40. The first source detector 42 may be a radiation detector, an ultraviolet detector, an infrared or near infrared detector, a photodetector, a visible light detector, or any other appropriate detector device, such as a charged coupled device. A first collimator 44 is proximal the first detector 42. The first collimator 44 collimates the emission from the emission source 40 and channels the collimated portion of the emission to the first detector 42. The first detector 42 produces a reference value which relates to the unattenuated emission intensity. The first detector 42 is chosen in such a manner to permit detection of the emission source 40. The first detector 42 will generate a unattenuated signal which will be used as a reference value for emission intensity prior to attenuation. The function of the first detector 42 is to provide this reference intensity signal for comparison to the attenuated signal. Such an unattenuated signal is to correct for changes in emission intensity with time due to battery drain, ambient temperature, or other physical conditions which may alter the inherent emission intensity or detection thereof.

The slotted disk 14 and bottom element 30 lay intermediate the emission source 40 and a second detector 50. The second detector 50 is fixed above slot 22 and aperture 36 on top element 37. The second source detector 50 may be a radiation detector, an ultraviolet detector, an infrared or near infrared detector, a photodetector, a visible light detector, or any other appropriate detector device, such as a charged coupled device. A second collimator 52 is proximal the second detector 50. The second collimator 52 collimates the attenuated emission from the emission source 40 and channels the collimated, attenuated portion of the emission into the second detector 50. The second collimator 52 insures that stray emanations other than those from the emission source do not interfere with the disk location determination. The emission is first rectangularly attenuated by the aperture 32 located on the bottom element 30. The emission is further attenuated by the slot 22 of the slotted disk 14. As the slotted disk 14 rotates due to the interaction of the elongated permanent magnet 16 with an external magnetic field, the slot 22 moves in relation to the second detector 50. As the slot 22 width varies with the slot 22 position about the circumference, different amounts of the emission are attenuated as a function of slotted disk 14 position. The second detector 50 produces an attenuated value which relates to the attenuated emission intensity.

The first source detector 42 and the second source detector 50 are chosen is such a fashion as to detect the emission from the emission source 40.

Referring now specifically to FIG. 2 a cross sectional view of the preferred embodiment is shown. The slotted disk 14 is centrally supported inside a cylindrical inner housing 28. The mounting means 18 permits free rotation of the slotted disk 14. The cylindrical inner housing 28 has a bottom element 30 which is located below the slotted disk 14 and a top element 37 located atop the slotted disk 14. The bottom element 30 and the top element 37 is equivalent geometrically to the slotted disk 14, and shares an approximately equivalent radius, circumference, diameter etc. A first aperture 32 is located on the bottom element 30. The first aperture 32 is rectangular and is orientated radially on the bottom element 30, the aperture's minimum rectangular dimension being approximately parallel to the circumference of the bottom element 30. The first aperture 32 length is equivalent to the maximum width 24 of the slot 22.

The inner housing 28 forms a chamber which is filled with a fluid 31. The fluid 31 is surrounded by a bottom element 30, a top element 37 and a side element 39 forming a cylindrical chamber. The fluid 31 damps the rotation of the slotted disk 14. The fluid 31 is also transparent to the emission, i.e. the fluid 31 permits the transmission of the emission without significantly degrading the emission's intensity. A first transparent membrane 33 covers the first rectangular aperture 32.

A second transparent membrane 35 covers a second aperture 36 located on the top element 37 of the inner housing 28. The second aperture 36 is also approximately rectangular, and has an appropriate orientation, preferably radially with its lesser dimension parallel to the circumference of the cylindrical inner housing 28. The greater dimension would be that of the maximum width 24 of the slot 22.

The emission source 40 is located below the bottom element 30. The first detector 42 is proximal the emission source 40. The first collimator 44 is proximal the first detector 42. The first collimator 44 collimates the emission from the emission source 40 and channels the collimated portion of the emission to the first detector 42. The first detector 42 produces a reference value which relates to the unattenuated emission intensity. The first detector 42 will generate a unattenuated signal which will be used as a reference value for emission intensity prior to attenuation. The function of the first detector 42 is to provide this reference intensity signal for comparison to the attenuated signal. Such an unattenuated signal is provided to correct for changes in emission intensity with time due to battery drain, ambient temperature, or other physical conditions which may alter the inherent emission intensity or detection thereof.

The slotted disk 14 and bottom element 30 lay intermediate the emission source 40 and a second detector 50. The second source detector 50 is fixed above slot 22. The second collimator 52 is proximal the second source detector 50. The second collimator 52 collimates the attenuated emission from the emission source 40 and channels the collimated, attenuated portion of the emission into the second detector 50. The second collimator 52 insures that stray emanations other than those from the emission source do not interfere with the disk location determination. The emission is first rectangularly attenuated by the aperture 32 located on the bottom element 30. The emission is further attenuated by the slot 22 of the slotted disk 14. As the slotted disk 14 rotates due to the interaction of the elongated permanent magnet 16 with an external magnetic field, the slot 22 moves in relation to the second detector 50. As the slot 22 width varies with the slot 22 position about the circumference, different amounts of the emission are attenuated as a function of slotted disk 14 position. The second detector 50 produces a attenuated value which relates to the attenuated emission intensity.

The comparison of the reference value with the attenuated value gives directional information and will be discussed below in greater detail.

It is to be understood that means to power an appropriate emission source 40, such as batteries for a light source, have been considered desirable. Also, a light bulb which may be detected by a cadmium sulfide photoconductive detector may be employed, both of these elements are susceptible to extremely low cost and are currently commercially available. In this case, the first detector means 42 and the second detector means 50 will be chosen to be cadmium sulfide photoconductive detectors.

It has been contemplated that a solar panel may be employed to charge the batteries in the instant invention. Such a mechanism would be expeditious as in the intended use of the device a solar flux or other light flux would be readily available to the user.

It is seen that one skilled in the art will readily acknowledge that the compass device may provide inclinational information. By rotating the device 90 degrees and with slight modification, a digital output corresponding to the instant inclination may be generated.

Figure 3:
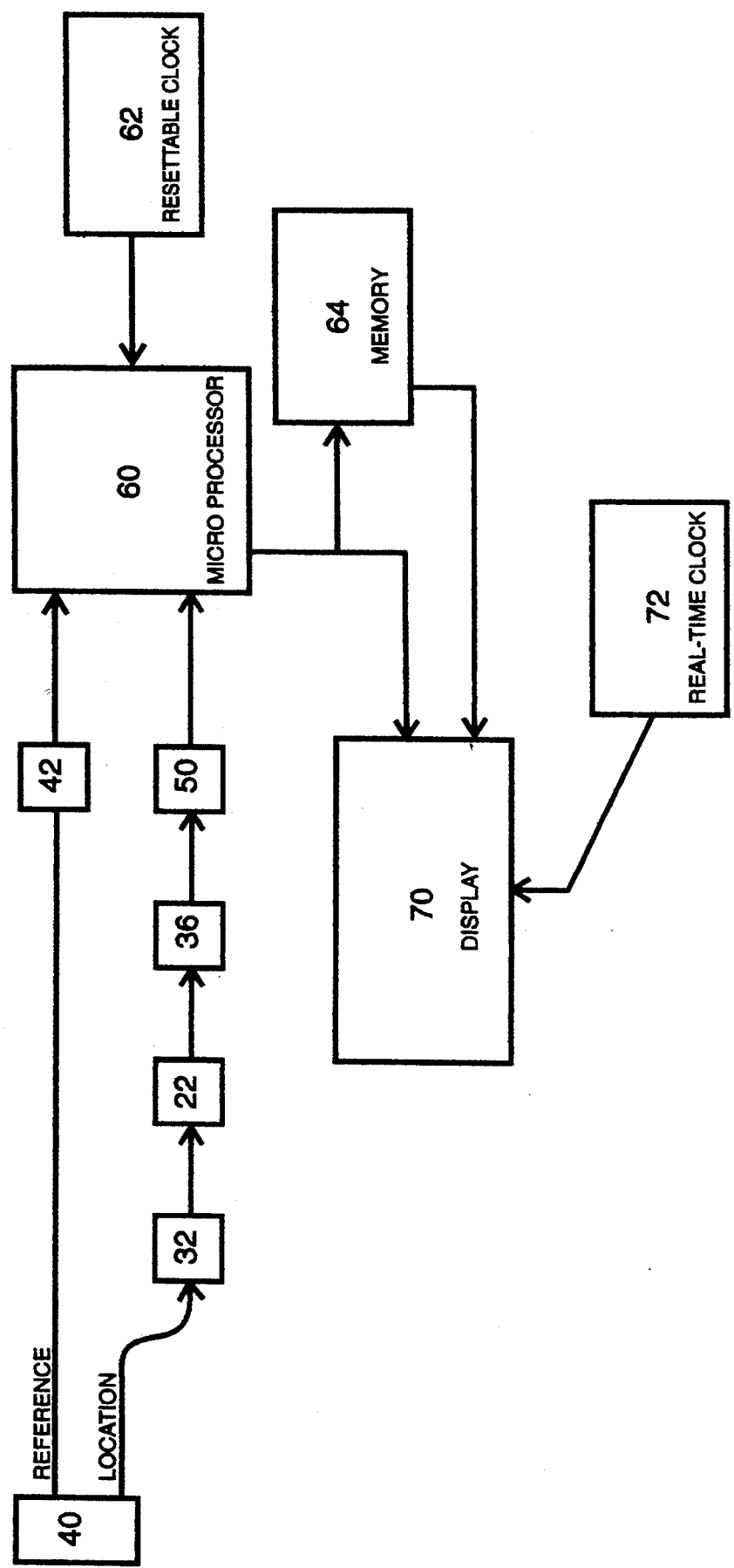
FIG. 3 presents a block diagram which discloses the different components of the compass device.
Figure 4:
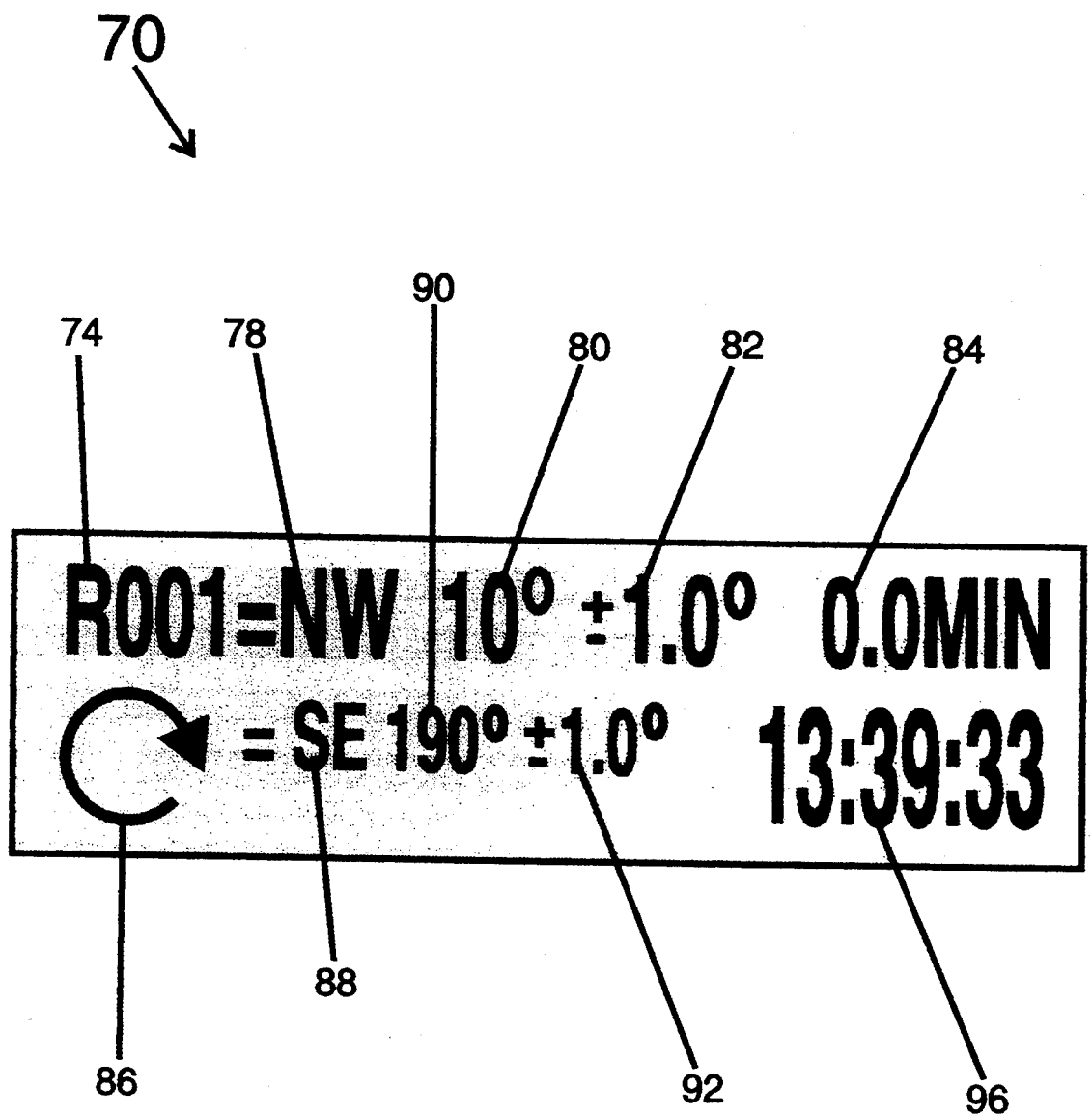
FIG. 4 illustrates the digital display employed as output to the user of the device.

Referring now specifically to FIG. 3, a block diagram is presented which relates various components of the compass device. A microprocessor 60 processes the attenuated signal generated by the second detector 50, and the non-attenuated or reference signal generated by the first detector 42. A resettable clock 62 provides a time signal of certain duration. The microprocessor 60 will evaluate the signals and store conditioned information as well as data concerning time and time intervals into a memory storage device 64. The conditioned signals conform to instant directional information, and the stored conditioned signals conform to previous directional information. Through simple processing a precise direction may be determined. A display face 70, as shown in FIG. 4, will display current direction, and may present data to allow the user to return to the point of origin. A real-time clock device 72 also may have its output displayed on the display face 70.

Calibration is accomplished by obtaining the maximum location signal from the second source detector 50 in a predefined direction. By design, the maximum signal from the second source detector 50 is obtained by orienting the compass apparatus 10 to Magnetic North. The microprocessor 60 receives both the reference signal from first source detector 42 and the location signal from second source detector 50. A ratio of the two signals is then calculated:

$$R_N = I_{max}/I_r$$

where $R_N$ is the calculated ratio for the intensity of magnetic North. $I_r$ is the intensity of the reference signal generated by first source detector 42 and $I_{max}$ is the maximum obtainable location detector signal from second source detector 50, at Magnetic North. Magnetic North, by convention, is taken to be both 0 and 360 degrees with the angle increasing in value moving clockwise around a circle from 0 degrees at Magnetic North to 360 degrees, again, at Magnetic North.

An unknown direction corresponds to a known measured intensity, $I_u$, and a new reference intensity, $I'_r$ measure simultaneously. The determination is made by pointing the compass in the forward direction indicated on the housing. The new reference signal for that observation determines the corrected $I_{max}$:

$$I'_{max} = I'_r \times R_N$$

The position is then determined from 0 to 359 degrees. Hence, 360 minus 360 divided by the corrected maximum intensity times the unknown intensity:

$$P_x = 360 - (360/I'_{max}) \times I_u$$

where $P_x$ is the location in degrees relative to the clockwise direction, with magnetic North as both 0 and 360 degrees. It is evident that when $I_u=0$, then $P_x=360$ degrees, and when $I_u=I'_{max}$, then $P_x=0$ degrees.

It is recognized that random sampling errors occur in obtaining the intensity values. For both calibration and unknown direction determination the microprocessor 60 will automatically take at least three samples, a few seconds apart, while the user is pointing the compass housing in the direction indicated. These samples will be averaged by the microprocessor 60 to provide a single reading and a standard deviation. These will be stored in memory 64 and displayed on display face 70. The standard deviation will be used to provide the user with an error estimate of the directional indication, such as the 95% confidence limit for the unknown direction. The determination of such a sampling error is well known and is not further discussed here. In addition to the unknown heading, the heading 180 degrees opposite of that determined will also be displayed for user convenience. The electronics and microprocessor technology required to accomplish these calculations are well known. Also, illustrated in FIG. 3 is a real-time clock 72 which will display correct time. A resettable clock 62 can function as a stop watch to store elapsed time intervals between readings for navigation purposes. The elapsed time intervals are stored in memory 64 along with other reading parameters which are pertinent to that time interval.

FIG. 4 illustrates the information which will be displayed. A display face 70 is provided with multiple readouts. Readout 74 displays which sample is currently being utilized. Readout 78 displays a compass heading utilizing cardinal points of the compass. Readout 80 displays a compass heading in degrees. Readout 82 displays the estimated error in the heading in degrees. Readout 84 displays the time interval in minutes between bearings.

Further readouts would be employed when retracing the path travelled. Readout 86 displays an indicator which shows the user information concerning the reverse path and shows the rear heading data located to the right of readout 86 on the display face 70. Readout 88 displays the back compass heading utilizing cardinal points which can be utilized when retracing the route travelled. Readout 90 displays a back compass heading in degrees. Readout 92 displays estimated heading error in degrees for the back compass heading. Display 96 is the current real-time display.

All of the displayed data may utilize LED or LCD readouts and may employ other readout devices. It is understood that FIG. 4 gives just one example of a possible configuration for the display face 70. Many other possible configurations for the display face 70 are possible and another may be preferred.

With the information stored and available for recall the user can sketch on paper or on a map the path traveled by employing standard dead reckoning methods. Using well known navigation methods paths so determined can be retraced within the precision of the apparatus disclosed herein. The intrinsic uncertainty and accuracy of the compass and factors which effect it's readings are well known hence not further detailed here.

Alternate Embodiment

Figure 5:
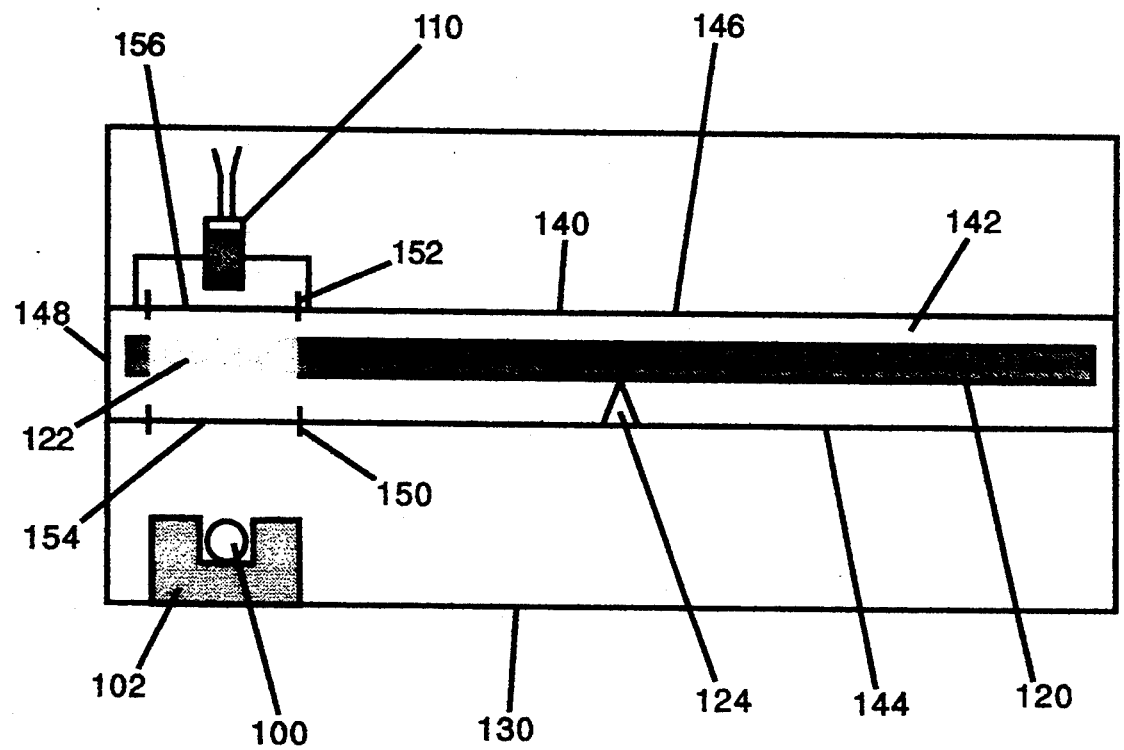
FIG. 5 illustrates an alternate embodiment where the emission source is a radioactive source.

Referring now to FIG. 5, an alternate embodiment is considered where the source emitter means 100 is a radioactive source and the source detector means 110 is an ionizing radiation or particle detector. The radioactive source 100 (source emitter means) resides in a seat 102. Seat 102 acts to collimate the radioactive emission toward aperture 150. A slotted disk 120 having a slot 122 has a mount 124 which permits the slotted disk 120 to freely rotate. The slot 122 is located on the circumference of the disk 120 and has the geometric configuration of an elongated triangle or ouroboros which has been scribed about the circumference of the disk 120.

An inner housing 140 is provided which is cylindrical in shape and forms a chamber which houses a liquid 142. This liquid 142 is transparent to radiation. The inner housing 140 has a bottom element 144, a top element 146 and a side element 148 which form a cylindrical chamber. The bottom element 144 has a first aperture 150 located thereon. The first aperture 150 is generally rectangular and is oriented radially on the bottom element 144 proximal the side element 148. The top element 146 has a second aperture 152 located thereon. The second aperture 152 is generally rectangular and is oriented radially on the top element 146 proximal the side element 148. A first membrane 154 covers the first aperture 150. A second membrane 156 covers the second aperture 152. The first membrane 154 and the second membrane 156 are both transparent to the radiation employed. The first aperture 150 and the second aperture 152 are in parallel relation to each other and form a path through the inner housing 140.

An outer housing 130 surrounds the device, and would contain other processing equipment such as a microprocessor, memory storage devices and time measurement devices.

Through the same mechanism as the previous embodiment, the emission is attenuated by the slot, giving directional information.

This embodiment does not require a source emitter power supply or a reference detector. The source intensity varies according to the half-life of the radioactive source employed. For example, using iron fifty-five as a source ($^{55}$Fe) with a reported half-life of 2.6 years monthly calibrations would provide ample confidence that the source strength was not diminished sufficiently to cause error in the unknown reading. Other isotopes, with longer half-lives can be used and would require yearly or greater intervals between calibrations.

It is apparent from the above that the present invention accomplishes all of the objectives set forth by providing a new and improved, low cost, orientation device with a digital output, which is sensitive to an external magnetic field, the device having simple circuitry and logic.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

I claim:

1. A compass device for determining direction relative to an external magnetic field, comprising:

an emitting means having an emission, said emission having a first intensity, a first detection means; said first detector means proximal to said emitting means, said first detector means detecting said first intensity, a second detector means;

a freely rotatable disk, said disk intermediate said emitting means and said second detector means, said disk having a magnet mounted thereon, said disk being generally circular, including a center and a circumference, said disk having a position relative to the external magnetic field, said disk including a slot, said slot proximal to the circumference and defining a passage through said disk, said passage having a width, said width varying linearly about the circumference, said passage permits a portion of said emission to propagate therethrough, said portion having a second intensity, said second intensity detected by said second detector means, whereby said first detector means generates a first signal proportional to said first intensity, and said second detector means generates a second signal proportional to said second intensity, wherein the ratio of said second signal to said first signal may be conditioned to give said disk position relative to the external magnetic field.

2. The compass device as claimed in claim 1 including a housing, said housing having an interior, wherein said emitting means, said first detector means, said second detector means and said disk reside within said interior.

3. The compass device as claimed in claim 1 including a clock, said clock for generating a time signal; and further including, a microprocessor means for storing, comparing and conditioning said first signal, said second signal, and said time signal in such a manner to generate a bearing, an instant direction, and an error.

4. The compass device as claimed in claim 1 wherein said emitting means is selected from the group consisting of a visible light source, a light emitting diode, an ultraviolet source, a radiation source and an infrared source.

5. The device as claimed in claim 4 wherein said first detector means and said second detector means are selected from the group consisting of a visible light detector, a photodetector, a charged coupled device, a radiation detector, an ultraviolet detector and an infrared detector.

6. The compass device as claimed in claim 1 wherein the external magnetic field is the Earth's magnetic field.

7. The compass device as claimed in claim 1 wherein said disk resides in a chamber, said chamber having a top element, a side element and a bottom element, said top element having a first aperture, said bottom element having a second aperture, said first aperture and said second aperture defining an emission passage.

8. The compass device as claimed in claim 1 wherein said first detector means is proximal a first collimator and said second detector means is proximal a second collimator, said first collimator and said second collimator utilized to collimate said emission.

9. The compass device as claimed in claim 2 wherein said disk is mounted in said interior by a mounting means.

10. The compass device as claimed in claim 3 wherein said time signal, said bearing, said instant direction, and said error are displayed on a liquid crystal display.

11. The compass device as claimed in claim 7 wherein said chamber is generally cylindrical, said chamber being filled with a fluid, said fluid being transparent to said emission.

12. The compass device as claimed in claim 1 wherein said first detection means is a cadmium sulfide photoconductive detector.

13. The compass device as claimed in claim 12 wherein said second detection means is a cadmium sulfide photoconductive detector.

14. The compass device as claimed in claim 1 wherein said slot is generally shaped in the form of an ouroboros.

15. The compass device as claimed in claim 1 wherein said slot is generally shaped as an elongated triangular cutout, superposed about said circumference.

16. The compass device of claim 1 wherein said emitter is proximal said circumference.

17. The compass device of claim 7 wherein said first aperture is covered by a first membrane, and said second aperture is covered by a second membrane, said first membrane and said second membrane being transparent to said emission.

18. The compass device as claimed in claim 1 wherein said emitting means is Iron-55.

19. The compass device as claimed in claim 18 wherein said first detector means and said second detector means are radiation detectors.

* * * * *